Dec. 22, 1925.  
J. F. O'CONNOR  
1,566,684  
FRICTION SHOCK ABSORBING MECHANISM  
Filed Dec. 14, 1922　　2 Sheets-Sheet 1
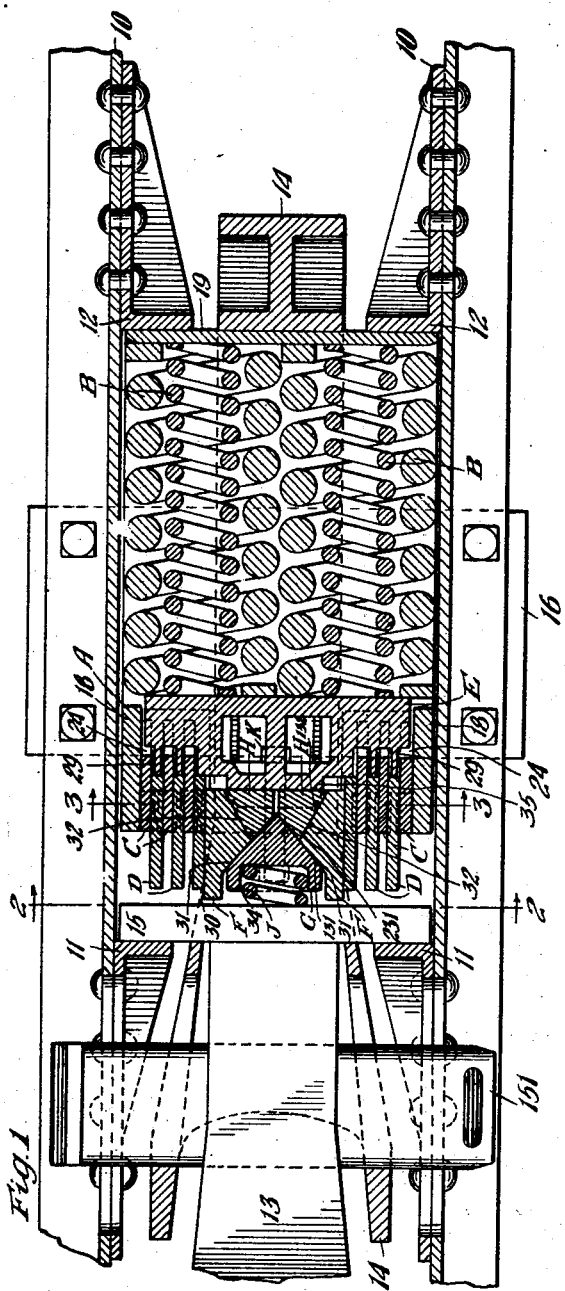
Witnesses  
Wm. Geiger
Inventor  
John F. O'Connor  
By Geo. I. Haight  
his Atty.

Dec. 22, 1925.
J. F. O'CONNOR
1,566,684
FRICTION SHOCK ABSORBING MECHANISM
Filed Dec. 14, 1922    2 Sheets-Sheet 2
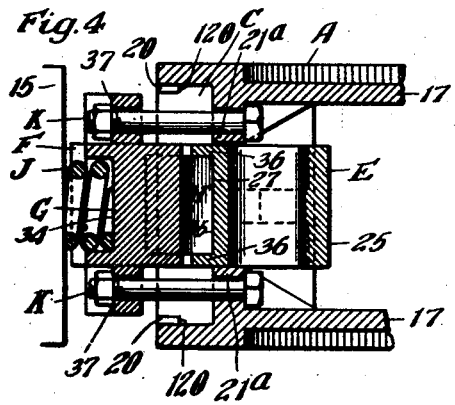
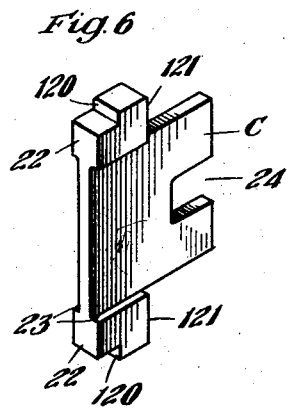
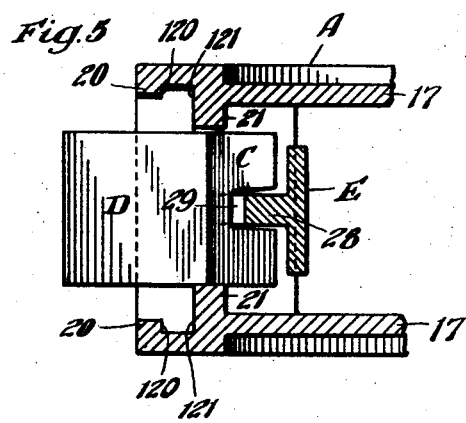
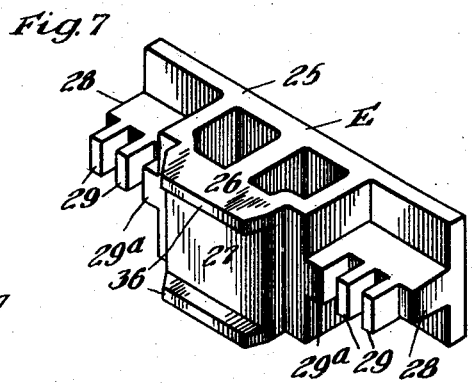
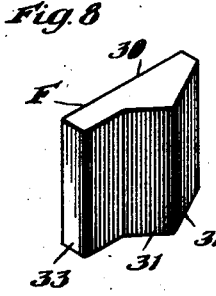
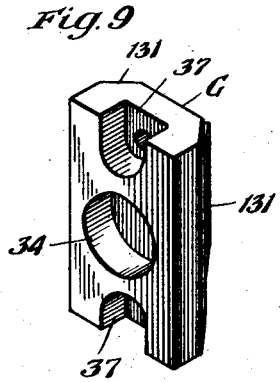
Witnesses
Wm. Geiger
Inventor
John F. O'Connor
By Geo. J. Haight
his Atty.

Patented Dec. 22, 1925.

1,566,684

UNITED STATES PATENT OFFICE.

JOHN F. O'CONNOR, OF CHICAGO, ILLINOIS, ASSIGNOR, BY MESNE ASSIGNMENTS, TO W. H. MINER, INC., A CORPORATION OF DELAWARE.

FRICTION SHOCK-ABSORBING MECHANISM.

Application filed December 14, 1922. Serial No. 606,923.

*To all whom it may concern:*

Be it known that I, JOHN F. O'CONNOR, a citizen of the United States, residing at Chicago, in the county of Cook and State of Illinois, have invented a certain new and useful Improvement in Friction Shock-Absorbing Mechanisms, of which the following is a full, clear, concise, and exact description, reference being had to the accompanying drawings, forming a part of this specification.

This invention relates to improvements in friction shock absorbing mechanisms.

This application is a continuation in part of my co-pending application, Serial Number 499,203, filed September 8, 1921.

Objects of the invention are to provide a high-capacity friction shock absorbing mechanism especially adapted for railway draft riggings wherein are obtained, certain release, large friction wearing areas, long life, and relatively low pressure per unit of frictional area.

A specific object of the invention is to provide an improved friction shock absorbing mechanism of the intercalated friction plate type, wherein means are employed in the wedging system for automatically compensating for wear on the friction plates to the end that there will be no lost motion in the mechanism throughout its life.

Other objects of the invention will more clearly appear from the description and claims hereinafter.

In the drawings forming a part of this specification, Figure 1 is a horizontal longitudinal sectional view of a portion of a railway draft rigging showing my improvements in connection therewith. Fig. 2 is a vertical transverse sectional view corresponding substantially to the line 2—2 of Fig. 1. Fig. 3 is an enlarged vertical transverse sectional view of the shock absorbing mechanism proper, corresponding substantially to the line 3—3 of Fig. 1. Figs. 4 and 5 are vertical longitudinal sectional views partly broken away, corresponding to the sectional lines 4—4 and 5—5, respectively, of Fig. 3. And Figs. 6, 7, 8 and 9 are detail perspectives of one of the stationary friction plates, the spring follower, one of the wedge friction shoes, and one of the wedge elements, respectively.

In said drawings, 10—10 denote channel draft sills of a railway car underframe, the same having front stop lugs 11—11 and rear stop lugs 12—12 secured to the inner faces thereof. A portion of a drawbar is indicated at 13, the same being operatively associated with the shock absorbing mechanism proper by a hooded cast yoke 14 and coupler key 151. The shock absorbing mechanism proper, hereinafter described, is disposed within the yoke as is also a main front follower 15. The yoke and parts therewithin are supported in operative position by a detachable saddle plate 16. The improved shock absorbing mechanism proper, as shown, comprises, broadly, a relatively heavy casting A which may be variously termed a column-load-sustaining member, follower-acting member or combined shell and spring cage; twin arranged springs B—B; a series of relatively stationary friction plates C—C; a series of relatively longitudinally movable friction plates D—D; a spring follower E; a pair of wedge friction-shoes F—F; a centrally disposed wedge element G; a pair of additional wedge elements H—H; a compensating spring J; and retainer bolts K—K.

The casting A is of hollow rectangular box-like form having upper and lower horizontal walls 17—17; side walls 18—18 and rear connecting wall 19. The side walls 18 are relatively short to thereby leave openings on the sides of the casting A to permit of the insertion and removal of certain of the parts.

The construction of the casting A at the outer or front end thereof provides a shell to which are anchored the relatively stationary friction plates C. For this purpose, said shell portion of the casting A is formed with upper and lower alined transversely extending sets of front ribs 20—20 forming rearwardly facing shoulders, and deeper ribs 21—21 providing forwardly facing shoulders, as best shown in Fig. 5.

The stationary plates C, as best shown by Figs. 3 and 6, are widened on their upper and lower edges as indicated at 22—22 so as to provide a cross-section of generally I-form. In this manner, longitudinally extending channels or guide grooves 23—23 are formed on opposite sides thereof with the exception of the outermost stationary friction plate C which bears directly against the side wall 18 of the shell which is perfectly flat on its outer side. The notched edges 22 of the plate C are notched or cut away so as to provide shoulders 120 and 121 cooperable with the ribs 20 and 21, respectively, to anchor said plates against longitudinal movement, but allowing them to respond freely to laterally applied pressure. Each plate C is, furthermore, recessed at its inner end as indicated at 24 in Fig. 6 for the purpose hereinafter described.

The movable friction plates D are of like construction and each is of substantially rectangular plate-like form with straight transverse front and rear edges. The same are of such width as to be readily accommodated in the channel guides provided by the stationary friction plates C and of such thickness as to insure spacing of the stationary plates C so that the latter may adjust themselves gradually as wear occurs. The stationary and movable plates are preferably divided into two laterally spaced groups as shown in Fig. 1 so as to leave the central space therebetween for the wedging system.

The spring follower E is preferably in the form of a casting of the contour best shown in Fig. 7. Said follower has a plain back wall 25, a hollow central forwardly extended enlargement 26 providing a front flat central wall 27, and transversely extending centrally disposed ribs 28—28 on each side of the central enlargement 26. The ribs 28 are adapted to work within the recesses 24 of the stationary plates C, as shown in Fig. 1. From the forward sides of the ribs 28 are extended flange-like projections 29—29 adapted to work between the stationary plates C and engage the inner edges of the movable plates D. The innermost movable plate D of each group is engaged by a shoulder 29$^a$ of the follower E. With this arrangement, the movable plates D may be alternately actuated from their front ends during compression and from their rear ends in release, while at the same time maintaining said plates D of lesser length than the stationary plates C. In normal position of the parts there is a space left between the front ends of the plates D and the follower 15, preferably approximating a half-inch, for the purpose hereinafter described.

Each of the wedge friction shoes F is provided on its outer side with a flat surface 30 adapted to directly contact with the innermost corresponding movable plate D. On its inner side, each element F is formed with a wedge face 31 sloping rearwardly and inwardly toward the center line of the mechanism and with another wedge face 32 sloping rearwardly and away from the center line of the mechanism. The outer transverse end 33 of each element F is adapted, during the compression of the gear, to be engaged by the inner side of the front follower to be actuated thereby. In the normal position of the parts, there is a space left between the front ends 33 of the elements F and the follower 15, preferably approximating a quarter of an inch, or about half the space left between the plates D and the follower 15, for the purpose hereinafter described.

The central wedge element G is formed on the inner side thereof with wedge faces 131—131 adapted to cooperate with the wedge faces 31 of the elements F—F and also with certain wedge faces on the wedge elements H—H as hereinafter described. On its outer side, the wedge element G is formed with a central recess 34 in which is seated the spring J, the latter bearing at its opposite end against the follower 15. It will be noted that ample clearance is left between the front or outer face of the element G and the follower 15 so as to allow the spring J to function properly, as hereinafter described.

The two wedge elements H are of like construction and each is formed on the outer side with a wedge face 132 adapted to cooperate with the corresponding wedge face 32 of an element F. Each element H is furthermore provided with a wedge face 231 adapted to cooperate with a wedge face 131 of the central element G. At their rear ends the elements H are formed with transversely extending flat faces 35 which bear against the face 27 of the spring follower E. The latter is provided with upper and lower forwardly extending flanges 36—36 which straddle the wedge elements H and thereby maintain the latter in proper position vertically.

Near the central portions of the casting A, the ribs 21—21 are deepened as indicated at 21$^a$ in Fig. 3 so as to provide ample metal for anchoring the inner ends of the retainer bolts K. The forward ends of the bolts K are anchored in suitable upper and lower recesses 37—37 formed in the wedge element G.

The operation is as follows, assuming an inward or buffing movement of the drawbar. As the drawbar moves inwardly thereby carrying the follower 15 with it, the first action of the mechanism will be a slight compression of the spring J. This action will continue for a distance corresponding to the space left between the front follower 15 and the shoes F, or until the follower engages with the shoes F, whereupon the wedge system compressing the elements F, G and H, and the spring J, will be shifted longitudinally, this movement of the wedge system being yieldingly resisted by the main springs B acting through the spring follower E. This shifting movement of the wedge system will continue for a distance corresponding to the remaining space left between the follower 15 and the front ends of the plates D, and it will be observed that the spring follower E is thereby removed from operative relation with the inner ends of the plates D. During this action, the plates D remain stationary but the lateral pressure exerted between the movable and stationary plates will be built up to the desired degree until the follower 15 engages the plates D when the latter will thereafter be moved in unison with the wedge system. With this arrangement, it will be observed that the lateral pressure exerted on the friction plates can be controlled and excessive pressure prevented. On account of the large amount of frictional wearing area provided, I am enabled to generate the necessary amount of frictional resistance without imposing excessive pressure on the wearing parts, thereby insuring long life to the mechanism. In release, the initial action will take place independently of any movement of the friction plates D, the spring follower E being forced outwardly under the expansion of the springs B and thereby causing the wedge system to be projected outwardly with respect to the movable plates until the projections 29 of the spring follower engage the inner ends of the plates D. At this point in the release action, it is obvious that the lateral pressure on the intercalated plates will have been reduced substantially to a minimum so that the remaining portion of the release stroke can be easily effected in the pushing out of the plates D.

As is understood by those skilled in the art, wear will gradually take place on the engaging surfaces of the stationary and movable plates. As such wear occurs, it is evident that the space between the two groups of intercalated plates will gradually widen, which, if not otherwise compensated for, would allow the wedge shoes F to creep up gradually with respect to the spring follower E and the movable friction plates, thereby decreasing the normal space between the inner ends of the shoes F and the outer face of the follower E. As will be obvious, this would effect a change in the operation of the mechanism since it would cause a gradual decrease in the amount of movement allowed the wedge shoes F prior to the actuation of the movable plates, this, in turn, causing a gradual reduction in the laterally applied pressure to the intercalated plates, at the time relative movement therebetween is initiated. With my arrangement, as wear occurs on the friction plates, this is automatically compensated for by the action of the wedge element G, which will cause a separation of the wedges H—H and shoes F—F as they are moved outwardly by the spring follower E, so that the relation between the wedge elements F and the friction plates D will not vary to any great extent. It is evident that as the spring follower E moves outwardly, the wedges H—H will be moved outwardly thereby and advanced with respect to the wedge element G, the outward movement of which is limited by the retainer bolts K, thereby effecting a gradual separation and outward movement of the wedge elements H—H and the wedge shoes F—F, the outward movement of the shoes F—F being permitted by the ends 33 being in spaced relation with reference to the front follower 15. By this arrangement proper contact between the wedge faces of the elements H—H and the wedge faces 32 of the elements F, and the proper relation between the spring follower E and the inner ends of the wedge elements F, is always maintained.

The hereinbefore described action will continue in service until the space provided between the follower E and the plates C—C disappears, whereupon the device may be restored to original condition by inserting a shim between the outermost plate of each group and the adjacent side wall of the shell.

I believe I am the first to provide means for automatically compensating for wear in a friction shock absorbing mechanism employing intercalated friction plates to prevent lost motion of the mechanism and the variation in the operation of the mechanism during service incident thereto, and intend to claim the same broadly. I am aware that many changes and modifications may be made in the details of construction without departing from the spirit of the invention, and all such changes and modifications are contemplated that come within the scope of the claims appended hereto.

I claim:

1. In a friction shock absorbing mechanism, the combination with a follower-acting member; of a series of relatively stationary friction elements anchored thereto and responsive to pressure applied transversely thereof; a series of relatively movable friction elements intercalated with said stationary friction elements; a main spring resistance; an outer follower movable relatively toward and from said follower member; and a pressure-transmitting wedge-system interposed between said outer follower and the spring resistance, arranged to exert pressure transverse to said intercalated friction elements, said system including wedge shoes coacting with said element; an expandible wedge coacting with said shoes and means for expanding said wedge to automatically adjust the same with respect to said shoes, to compensate for wear on the friction elements.

2. In a friction shock absorbing mechanism, the combination with a follower-acting member; of a series of relatively stationary friction elements anchored thereto and responsive to pressure applied transversely thereof; a series of relatively movable friction elements intercalated with said stationary friction elements; a main spring resistance; an outer follower movable relatively toward and from said follower member; and a pressure-transmitting-wedge-system interposed between said outer follower and the spring resistance, arranged to exert pressure transverse to said intercalated friction elements, said system including a laterally expandible wedge, a spreading member for said wedge and expansible spring means interposed between one of said elements and said outer follower.

3. In a friction shock absorbing mechanism, the combination with a follower-acting member; of a series of relatively stationary friction elements anchored thereto and responsive to pressure applied transversely thereof; a series of relatively movable friction elements intercalated with said stationary friction elements; a main spring resistance; an outer follower movable relatively toward and from said follower member; and a pressure-transmitting-wedge-system interposed between said outer follower and the spring resistance, arranged to exert pressure transverse to said intercalated friction elements, said system including a wedge element directly cooperable with one of the intercalated friction elements and adapted to be actuated by said outer follower, said wedge element having its outer end normally spaced from said follower, a second wedge element cooperable with the first named wedge element and arranged to be resisted by the main spring resistance, a third wedge element cooperable with both of said other wedge elements; and spring means interposed between said outer follower and said third named wedge element.

4. In a friction shock absorbing mechanism, the combination with a follower-acting member; of a plurality of relatively stationary friction plates anchored to said member against longitudinal movement with respect thereto but responsive to transversely applied pressure; a plurality of relatively movable friction plates intercalated with the stationary friction plates; said intercalated plates being divided into two spaced groups; a main spring resistance; an outer follower movable relatively toward and from said follower member; and a pressure-transmitting wedge system located between said groups of plates and interposed between said outer follower and the main spring resistance, said system being adapted to be engaged by said outer follower and moved bodily inwardly therewith and arranged to exert pressure transversely against said plates, said system including a plurality of cooperable wedge elements, an expansible wedge block, and means for yieldingly maintaining said wedge block expanded and effecting relative adjustment of the wedge system as wear on the friction plates occurs.

5. In a friction shock absorbing mechanism, the combination with a follower-acting member; of a plurality of relatively stationary friction plates anchored to said member against longitudinal movement with respect thereto but responsive to transversely applied pressure; a plurality of relatively movable friction plates intercalated with the stationary friction plates, said intercalated plates being divided into two spaced groups; a main spring resistance; an outer follower movable relatively toward and from said follower member; and a pressure-transmitting wedge system located between said groups of plates and interposed between said outer follower and the main spring resistance and arranged to exert pressure transversely against said plates, said system including two wedge elements, each directly cooperable with one of the groups of plates, and adapted to be actuated by said outer follower, a pair of wedge elements, each cooperable with one of said first named wedge elements and spring resisted, another wedge element, common to all of the first named wedge elements, and spring means interposed between said last named wedge element and said outer follower.

6. In a friction shock absorbing mechanism, the combination with a follower-acting member; of a plurality of relatively stationary friction plates anchored to said member against longitudinal movement with respect thereto but responsive to transversely applied pressure; a plurality of relatively movable friction plates intercalated with said stationary friction plates, said intercalated plates being divided into two spaced groups; a main spring resistance; an outer follower movable relatively toward and from said follower member; a pressure-transmitting wedge system located between said groups of plates and interposed between said outer follower and the main spring resistance and arranged to exert pressure transversely against said plates, said system including two wedge elements, each directly cooperable with one of the groups of plates, and adapted to be actuated by said outer follower, a pair of wedge elements each cooperable with one of said first named wedge elements and spring resisted, another wedge element, common to all of the first named wedge elements, and spring means interposed between said last named wedge element and said outer follower; and a spring follower interposed between the main spring resistance and said second named pair of wedge elements.

7. In a friction shock absorbing mechanism, the combination with a follower-acting member; of a plurality of relatively stationary friction plates anchored to said member and held against longitudinal movement with respect thereto; a plurality of relatively movable friction plates alternated with said stationary friction plates, the inner ends of said movable friction plates being normally positioned intermediate the ends of the stationary plates; lateral pressure-creating means cooperable with said plates; a spring resistance; a follower interposed between said spring resistance and the friction plates; and members parallel to the plates extending between the stationary plates and normally engaging the inner ends of the movable plates, said members being movable in unison with the follower.

8. In a friction shock absorbing mechanism, the combination with a follower-acting member; of a plurality of relatively stationary friction plates anchored to said member and held against longitudinal movement with respect thereto; a plurality of relatively movable friction plates alternated with said stationary friction plates, the inner ends of said movable friction plates being normally positioned intermediate the ends of the stationary plates; lateral pressure-creating means cooperable with said plates; a spring resistance; and a spring-follower interposed between said resistance and the friction plates, said follower having integral forwardly extended flanges movable between the stationary friction plates and normally engaging the inner ends of the movable friction plates.

9. In a friction shock absorbing mechanism, the combination with a casting having a hollow rectangular shell at one end and a spring cage; of a main spring resistance disposed within said cage; a plurality of relatively stationary friction plates anchored within said shell against longitudinal movement with respect thereto but responsive to laterally applied pressure; a plurality of relatively longitudinally movable friction plates alternated with said stationary plates, said movable and stationary plates being divided into two laterally separated groups; a spring follower interposed between said spring resistance and the inner ends of said movable plates; an outer follower movable toward and from said casting and normally spaced from the outer ends of the movable friction plates; and a wedge system interposed between said two groups of plates, said wedge system comprising, two combined wedge-friction-shoes, having their outer ends normally spaced from the outer follower, and each in engagement with the innermost friction plate of the corresponding group, a central wedge element between said wedge-friction-shoes, a pair of inner wedge elements bearing on said spring follower and having wedge engagement with both of said wedge-shoes and the other wedge elements; and an expansible spring interposed between said last named wedge element and said outer follower.

In witness that I claim the foregoing I have hereunto subscribed my name this 27 day of October, 1922.

JOHN F. O'CONNOR.